(12) United States Patent
Hung

(10) Patent No.: US 7,199,555 B2
(45) Date of Patent: Apr. 3, 2007

(54) PORTABLE EMERGENCY VEHICLE BATTERY CHARGER WITH MICROPROCESSOR

(75) Inventor: Chien-Ming Hung, Taichung (TW)

(73) Assignee: Chien Hung Taiwan Ltd., Taya Hsiang, Taichung Hsien (TW)

( * ) Notice: Subject to any disclaimer, the term of this patent is extended or adjusted under 35 U.S.C. 154(b) by 359 days.

(21) Appl. No.: 10/850,285

(22) Filed: May 19, 2004

(65) Prior Publication Data

US 2005/0258797 A1    Nov. 24, 2005

(51) Int. Cl.
*H01M 10/46* (2006.01)
(52) U.S. Cl. ...................................... 320/114
(58) Field of Classification Search ............... 320/103, 320/104, 108, 109, 114, 115, 105, 141, 166
See application file for complete search history.

(56) References Cited

U.S. PATENT DOCUMENTS 4,791,347 A * 12/1988 Britton ....................... 320/110
4,794,058 A * 12/1988 Thiess ......................... 429/116
5,955,866 A * 9/1999 Peng ........................... 320/105
2002/0030466 A1* 3/2002 Tracey ........................ 320/104

* cited by examiner

*Primary Examiner*—Edward H. Tso
(74) *Attorney, Agent, or Firm*—patenttm.us; James H. Walters (57) ABSTRACT

A portable emergency vehicle battery charger has a portable case, a battery and a circuit board. The battery and circuit board are mounted in the portable case. The case mainly has a power out socket connected to the battery through the circuit board, a power input socket connected to the battery and a power supply switch connected between the circuit board and the battery. The power output socket is a cigar-lighter socket. When a vehicle battery does not have sufficient charge to start an engine, the driver uses a jumper cable connected between a cigar-lighter in the vehicle and the power output socket to charge the battery. Then the driver turns the power supply switch on to provide a constant current to the vehicle battery.

3 Claims, 9 Drawing Sheets

PORTABLE EMERGENCY VEHICLE BATTERY CHARGER WITH MICROPROCESSOR

BACKGROUND OF THE INVENTION

1. Field of the Invention

The present invention relates to a vehicle battery charger and more particularly to a portable emergency vehicle battery charger that is easy and convenient to use.

2. Description of Related Art

Vehicle drivers often fail to close vehicle doors completely or to turn off the vehicle lights so the vehicle's battery, especially an old battery, quickly discharges. When the battery discharges significantly or dies, the vehicle engine will not start from the vehicle battery. Vehicle batteries also discharge when vehicles are not driven for a long time.

In lieu of simply replacing a dead battery, a driver with a dead battery must get a "jump start" or an emergency charge. A "jump start" requires that the driver either has or be able to obtain jumper cables and find another driver with a vehicle that can get close enough to his vehicle to connect the batteries with the jumper cables. This emergency technique is not convenient and not easy to do for people without basic knowledge about the mechanical and electrical aspects of their vehicles.

To overcome the shortcomings, the present invention provides a portable emergency vehicle battery charger to mitigate or obviate the aforementioned problems.

SUMMARY OF THE INVENTION

The main objective of the present invention is to provide an emergency vehicle battery charger that is small and easy and convenient to use.

Another objective of the present invention is to provide an emergency vehicle battery charger that has an illumination device.

Another objective of the present invention is to provide a battery indicator to display the stored voltage of a battery.

Other objectives, advantages and novel features of the invention will become more apparent from the following detailed description when taken in conjunction with the accompanying drawings.

DETAILED DESCRIPTION OF THE PREFERRED EMBODIMENT

With reference to FIGS. 1, 2, 7 and 8, a portable emergency vehicle battery charger in accordance with the present invention includes a portable case (10), a battery (20), a circuit board (30), an optional illumination device (40) and a jumper cable (50).

The portable case (10) has a handle (101), a power output socket (13), a power supply switch (11B), a power input socket (14), an optional battery indicator (12), an optional illumination switch (11A) and an optional fuse socket (15). The power output socket (13) is a cigar-lighter type socket and connects with the portable emergency vehicle battery charger and a cigar-lighter socket (61) in a vehicle by the jumper cable (50). The power input socket (14) connects to an external battery charger (34).

Figure 3:
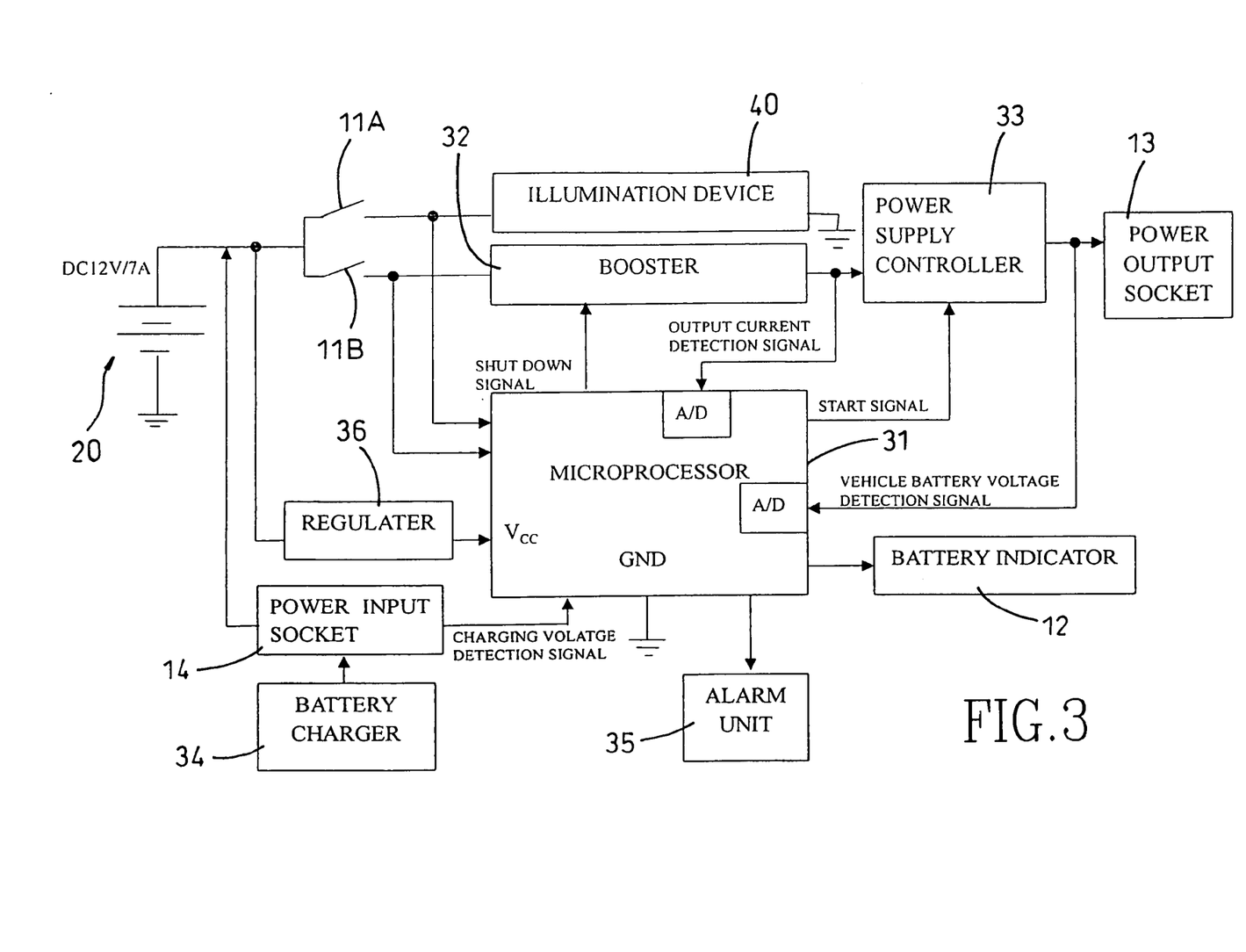
FIG. 3 is a functional block diagram of a circuit board in the emergency vehicle battery charger in FIG. 1.

With further reference to FIG. 3, the battery (20) is mounted in the case (10), provides power to the circuit board (30) and the optional illumination device (40) and is recharged with an external battery charger (34). The battery (20) is connected to the circuit board (30) through the power supply switch (11B), and to the external battery charger (34) through the power input socket (14).

The circuit board (30) is mounted in the case (10), is connected to the power output socket (13), the battery indicator (12) and the fuse socket (15) and includes a microprocessor (31), a power regulator (36), a booster (32), a power supply controller (33), numerous electrical components and an optional alarm unit (35). The numerous electrical components include a first rheostat (VR1) and a second rheostat (VR2).

Figure 4A:
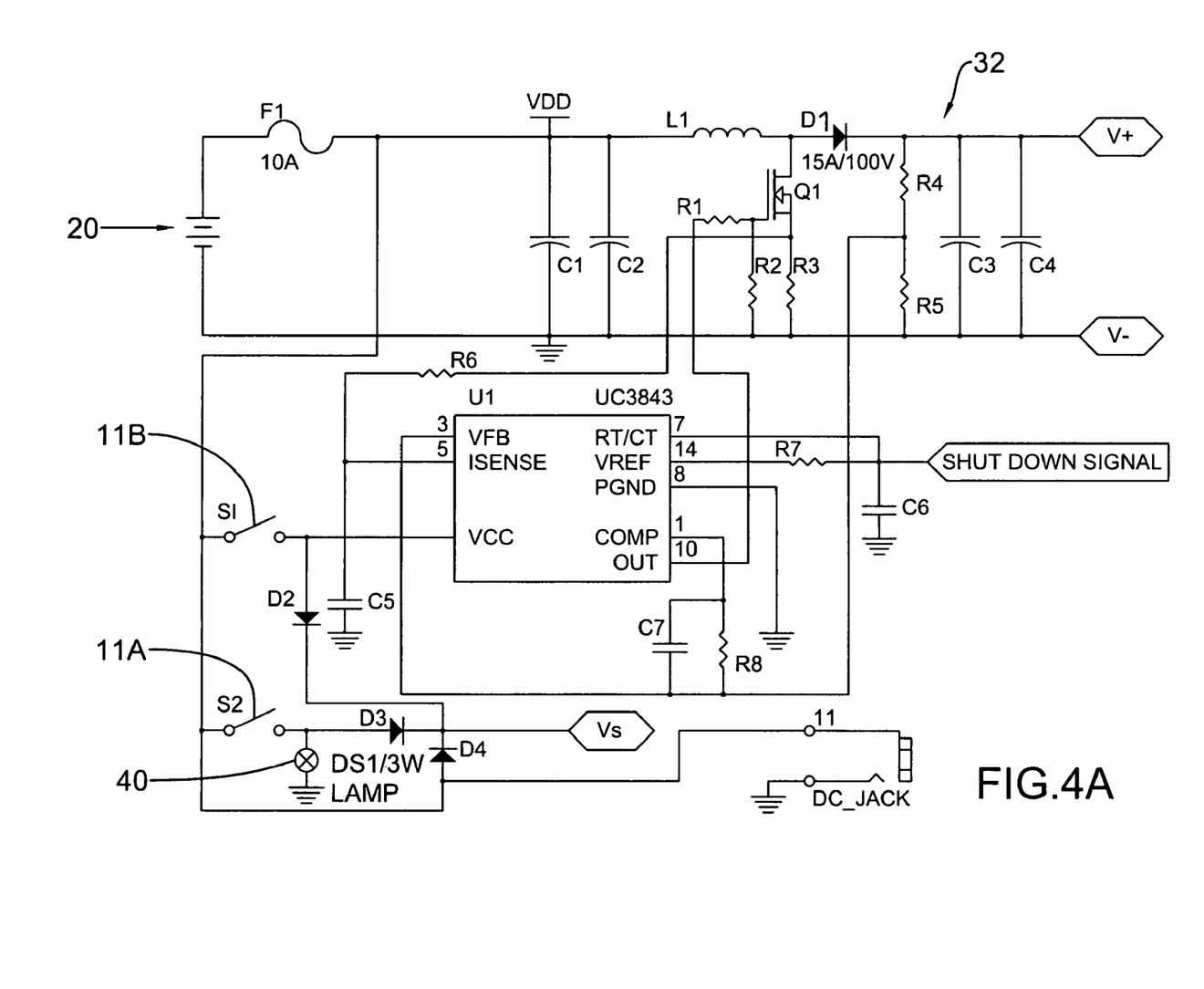
FIG. 4A is a detailed circuit diagram of a voltage booster circuit segment of the emergency vehicle battery charger in FIG. 1.
Figure 4B:
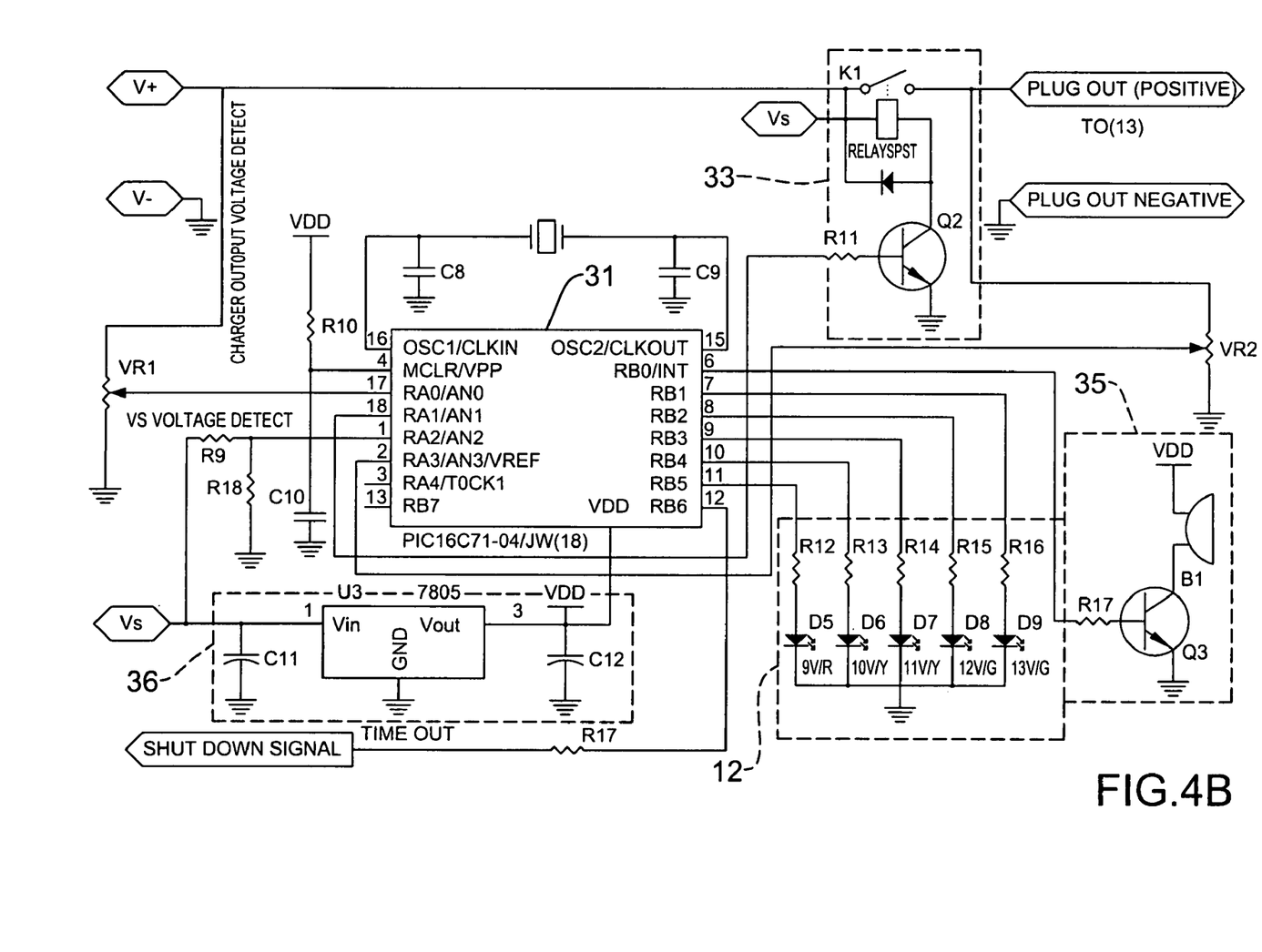
FIG. 4B is a detailed circuit diagram of the remaining elements of the emergency vehicle battery charger in FIG. 1.

With further reference to FIGS. 4A and 4B, the microprocessor (31) has a power supply auto-controlling program, is connected to the battery (20) through the power regulator (36) to obtain a suitable DC voltage and is connected to the power supply switch (11B) and illumination switch (11A). The microprocessor (31) is connected to the power output terminal (V+, V−) of the booster (32) through the first rheostat (VR1). The microprocessor (31) monitors the voltage of a vehicle battery. Since a constant current is output through the power output terminal (V+, V−), the microprocessor (31) detects the voltage status of the power output terminal (V+, V−) through the first rheostat (VR1). The microprocessor (31) is connected to the power output socket (13) through the second rheostat (VR2) to detect the vehicle battery voltage.

The booster (32) outputs a constant current, has a power source input terminal, a disable terminal and a power output terminal and mainly comprises a PWM generator and current compensation IC (U1), an electronic switch (Q1), a booster inductance (L1), a resistor (R3), an RC oscillator (R7, C6) and an optional fuse (F1). The power source input terminal is connected to the battery (20) through the power supply switch (1B). The disable terminal is connected to the microprocessor (31). The power output terminal is connected to the microprocessor (31) and the power supply controller (33). The microprocessor (31) is connected to the power output terminal (V+, V−) of the booster (32) through the first rheostat (VR1).

The PWM generator and current compensation IC (U1) has a power input (VCC), a PWM output (OUT), a clock signal input (RT/CT) and a current feedback input (ISENSE). The power input (VCC) is connected to the battery (20) through the power supply switch (11B). The PWM output (OUT) is connected to the electronic switch (Q1), the current feedback input (ISENSE) and ground. The clock signal input (VREF) is connected to the RC oscillator (R7, C6), and the capacitor (C6) is connected to the microprocessor (31). When the microprocessor (31) outputs a low voltage shut down signal to the capacitor (C6), the RC oscillator (R7, C6) stops outputting a clock signal, and the PWM generator and current compensation IC does not output a PWM signal to control a duty cycle of the electronic switch (Q1).

The electronic switch (Q1) is connected to the battery (20) through the booster inductance (L1) and the fuse (F1) and has an open and closed duty cycle. The booster inductance (L1) is connected to the power output terminal (V+, V−). The fuse (F1) is mounted in the fuse socket (15) on the case (10) so the dead fuse is easy to replace.

When the power supply switch (11B) is closed, the PWM generator and current compensation IC outputs a PWM signal through the PWM output (OUT). The PWM signal controls the duty cycle of the electronic switch (Q1) according to the voltage dropped across the resistance (R3) to make the booster inductance (L1) output a constant current to the power output terminal (V+, V). The current from the booster (32) is monitored by the microprocessor (31).

The power supply controller (33) has a control terminal, a power input, a power output, a transistor (Q2), a relay (RELAYSPST) and a switch (K1). The control terminal is connected to the microprocessor (31). The power input is connected to the power output terminal (V+, V−) of the booster (32). The power output is connected to the power output socket (13) and the microprocessor (31). The relay (RELAYSPST) has a coil. The transistor (Q2) has a base terminal, a collector terminal and an emitter terminal. The base terminal is connected to the microprocessor (31), the collector terminal connected to the coil of the relay (RELAYSPST), and the emitter terminal connected to ground. The switch (K1) is connected between the power output socket (13) and the power output terminal (V+, V−) of the PWM generator and current compensation IC (U1).

The alarm unit (35) consists of a transistor (Q3) and a buzzer (B1). The transistor (Q3) has a base terminal, a collector terminal and an emitter terminal. The base terminal is connected to the microprocessor (31), the collector terminal is connected to the buzzer (B1), and the emitter terminal is connected to ground. When the microprocessor (31) outputs a high voltage to turns on the transistor (Q3), the buzzer (B1) generates an audible alarm signal.

The battery indicator (12) consists of multiple LEDs (D5–D9) different colors. The LEDs (D5–D9) are connected to the microprocessor (31). The microprocessor controls the LEDs (D5–D9). One LED (D5) is red, two LEDs (D6, D7) are yellow, and two LEDs (D8, D9) are green.

When the charge on the battery (20) is low, the microprocessor (31) turns on the red LED (D5). When the battery (20) is not fully charged but can provide enough power to charge the vehicle battery, the microprocessor (31) turns on the yellow LEDs (D6, D7). When the battery (20) is fully charged the microprocessor (31) tuns on the green LEDs (D8, D9).

Figure 5:
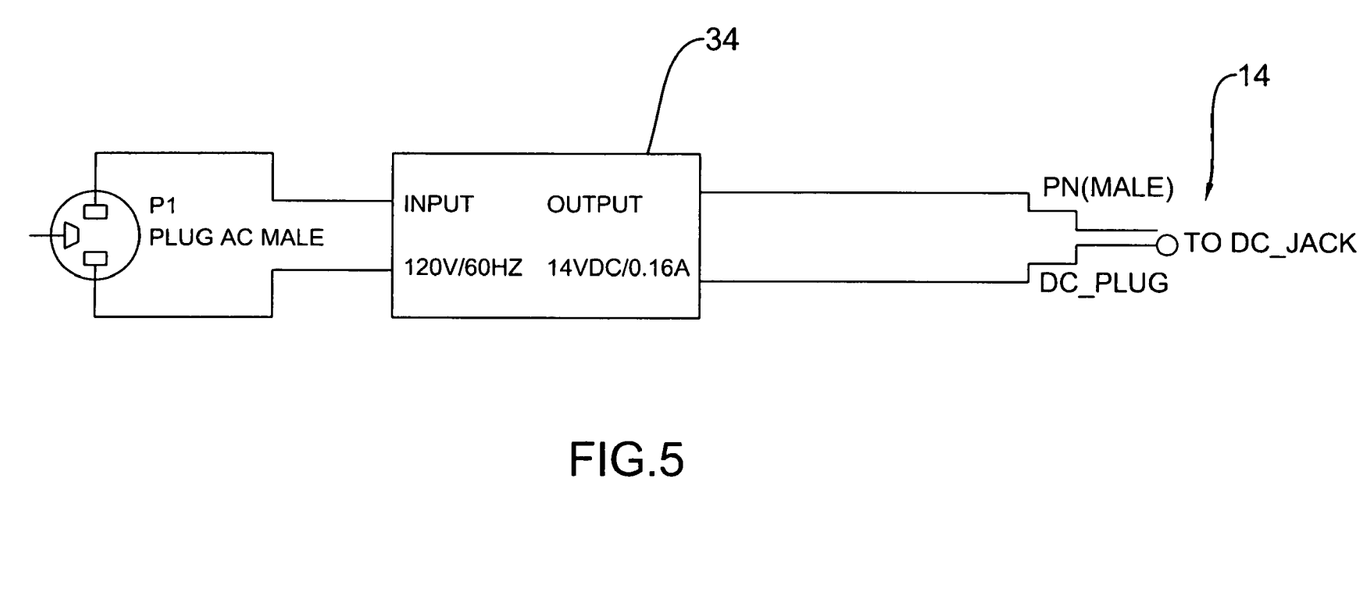
FIG. 5 is a functional block diagram of an external battery charger used with the emergency vehicle battery charger in FIG. 1.
Figure 8:
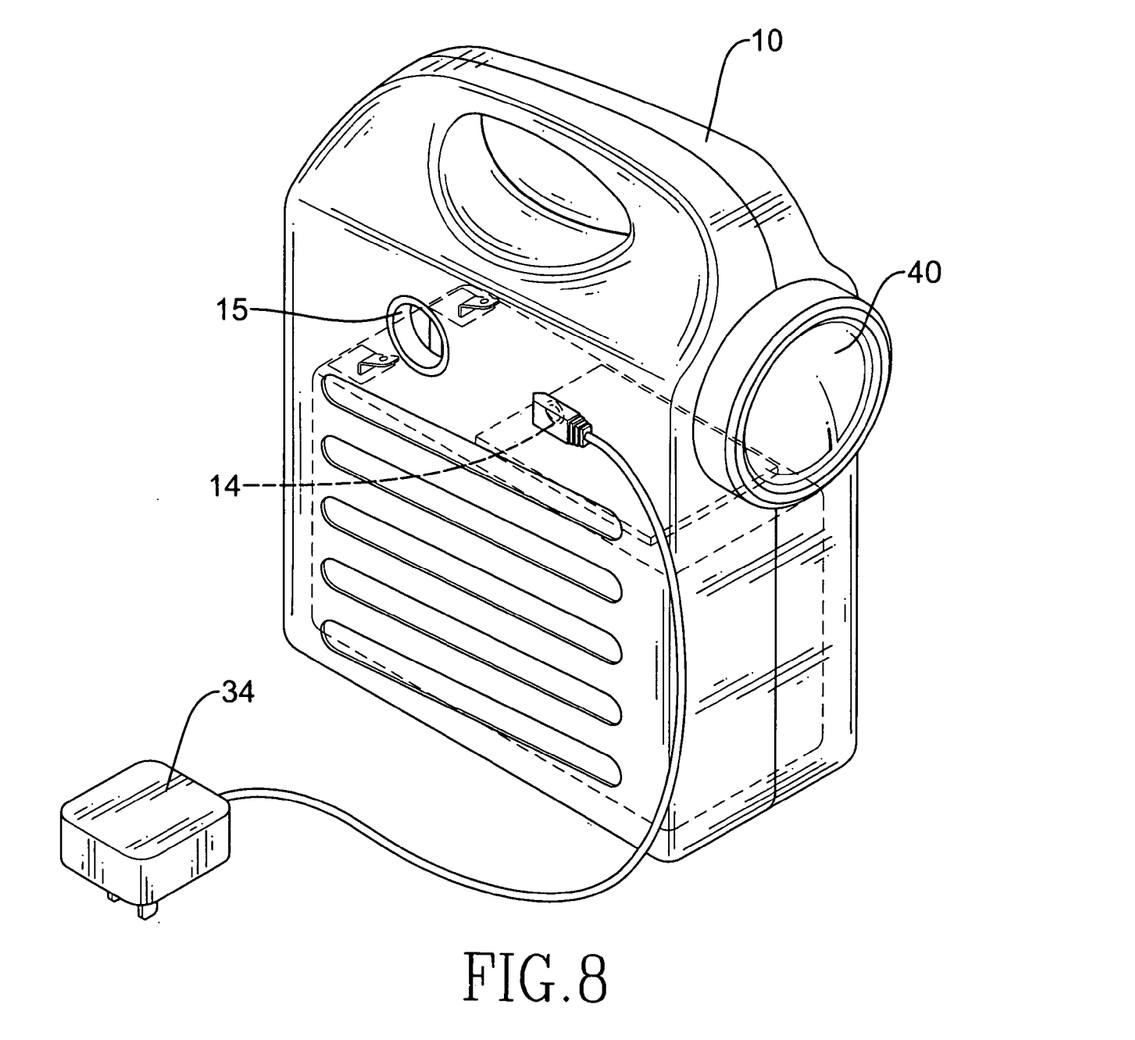
FIG. 8 is an operational perspective view of the emergency vehicle battery charger in FIG. 1 connected to a rectifier.

With reference to FIGS. 5 and 8, the driver should use the battery charger (34) to charge the battery (20) when the red LED turns on. The battery charger (34) is connected between the power input socket (14) on the case (10) and an AC power source (not shown). The battery charger (34) charges battery (20) until the green LEDs (D8, D9) turn on.

Figure 7:
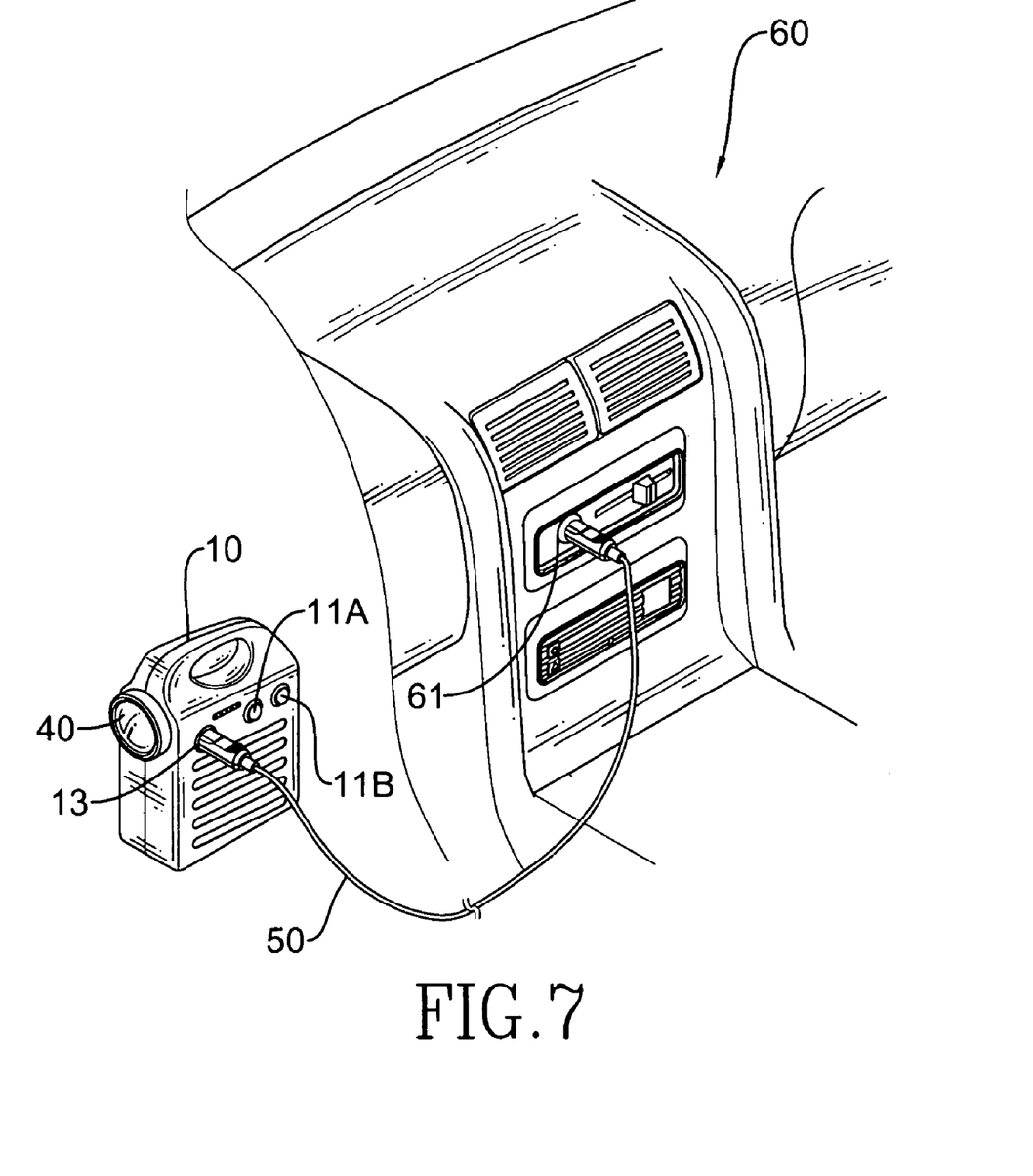
FIG. 7 is an operational perspective view of the emergency vehicle battery charger in FIG. 1 connected to a cigar-lighter in a vehicle.

The jumper cable (50) comprises a two lead electrical cable and two cigar lighter plugs. The jumper cable (50) has two ends, and the cigar lighter plugs are mounted respectively on the ends. One cigar lighter plug plugs into the power output socket (13), and the other cigar lighter plug plugs into a cigar lighter socket (61) in the vehicle.

When a driver turns on the power supply switch (11B), the booster (32) outputs a constant current. At the same time, the microprocessor (31) turns on the transistor (Q2) in the power supply controller (33) to allow constant current to pass through the relay (RELAYSPST) to the power output socket (13). The microprocessor (31) monitors the output current from the booster (32) and the voltage of the vehicle battery (not shown) and the battery (20) in the case (10). When the microprocessor (31) detects an abnormal output current from the booster (32), the microprocessor (31) outputs a shut down signal to the PWM generator and current compensation IC (U1) to stop the booster (32) outputting current.

Figure 1:
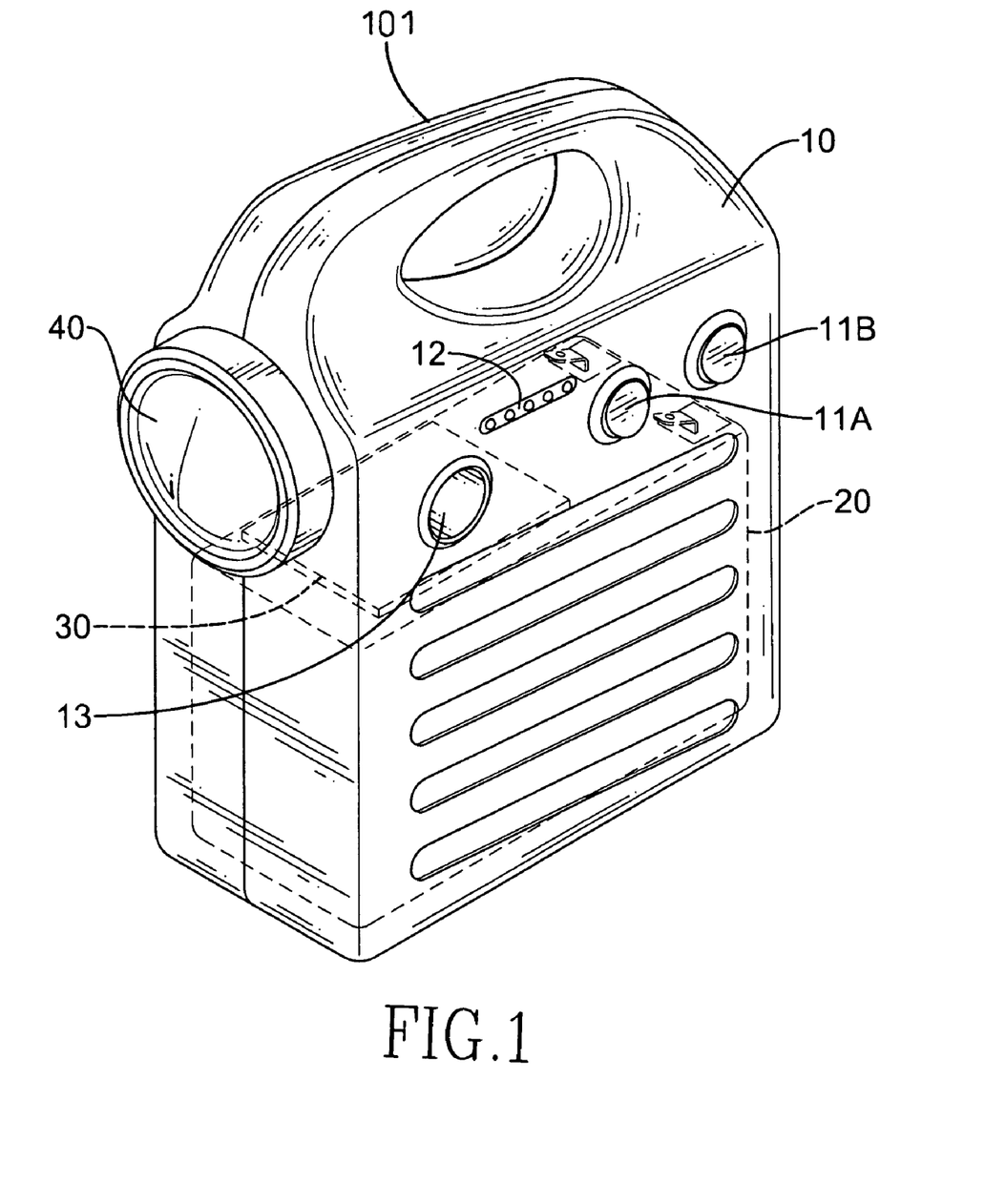
FIG. 1 is a perspective view of an emergency vehicle battery charger in accordance with the present invention.
Figure 2:
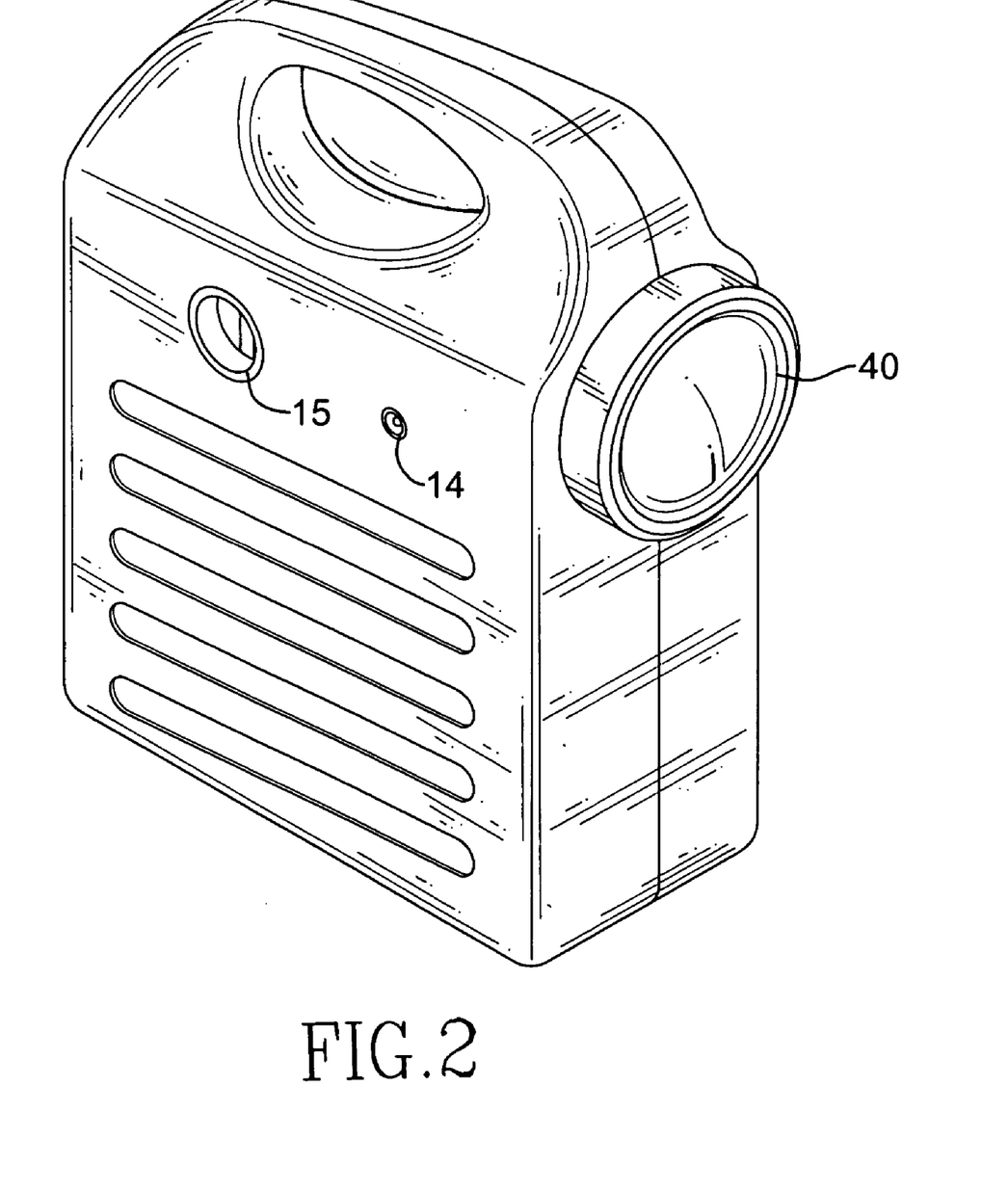
FIG. 2 is a perspective view of the emergency vehicle battery charger in FIG. 1.

With reference to FIGS. 1 and 7, the illumination device (40) is mounted on the case (40) and is connected to the battery (20) through the illumination switch (11A). When a driver uses the present invention at night, the driver turns on the illumination switch (11A) to provide light for the vehicle (60). Then, the driver connects the jumper cable (50) to the cigar lighter socket (61) and the power output socket (13) and turns on the power supply switch (11B) to supply charging power to the vehicle battery (not shown).

Figure 6:
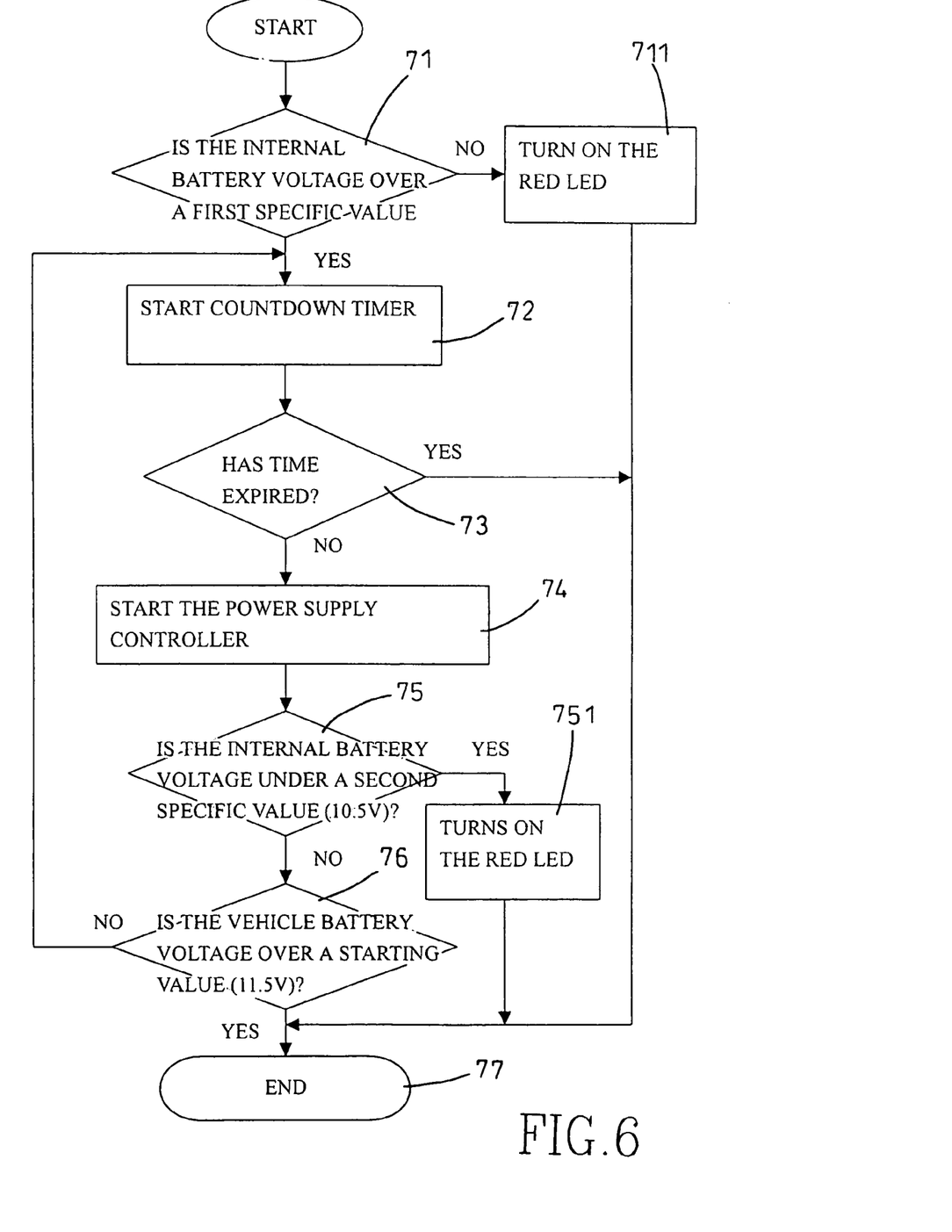
FIG. 6 is a logic diagram of a microprocessor in the emergency vehicle battery charger in FIG. 1.

With reference to FIG. 6, the power supply auto-controlling program in the microprocessor controls the operation of the portable emergency vehicle battery charger by monitoring the internal battery (20) and the vehicle battery and turning off the portable emergency vehicle battery charger when the vehicle battery is fully charged or the internal battery (20) needs recharging. The power supply auto-controlling program has the following steps.

(a) Detecting whether the internal battery (20) voltage is greater than a first specific value (71). If the voltage is greater than the first specific value, the program continues to the next step. If not, the microprocessor turns on the red LEDs and turns off the portable emergency vehicle battery charger (711).

(b) Starting a countdown timer (72).

(c) Detecting whether the time has expired (73). If the time has expired, the microprocessor turns off the portable emergency vehicle battery charger. If not, the microprocessor turns on the power supply controller to output charging current to the vehicle battery (74).

(d) Detecting whether the internal battery voltage is less than a specific value (75). If the voltage is less than the specific value, the microprocessor turns on the red LEDs (751), and the program ends (77). If the voltage is still greater than the specific value, the program will execute the next step.

(e) Detecting whether the vehicle battery voltage is greater than or equal to a specific start voltage (76). If the vehicle battery has charged enough to start the engine, the program will end (77). If not, the microprocessor will continue to execute steps (c) to (e).

Based on the forgoing description, the present invention provides a portable emergency vehicle battery charger for a driver. The driver does not have to ask a person in another car for an emergency charge or a jump-start. Furthermore, since a dead vehicle battery does not have power to light the lights in the vehicle, the present invention provides an illumination device provides a light source for the driver in the dark.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable emergency vehicle battery charger, comprises:
   a portable case having a handle, a power output socket, a power supply switch and a power input socket, wherein
      the power output socket is a cigar-lighter type for being connected to a cigar-lighter socket in a vehicle; and
      the power input socket for being connected to an external battery charger;
   a battery mounted in the case and connected to the power input socket so the external battery charger can charge the battery;
   a circuit board mounted in the case, connected to the power supply socket, the battery and the power supply switch to output a constant charging current to the power output socket and comprising
      a microprocessor connected to the battery through a regulator to obtain a suitable DC voltage, the power supply switch and the illumination switch;
      a booster having
         a power source input terminal connected to the battery through the power supply switch;
         a disable terminal connected to the microprocessor; and
         a power output terminal connected to the microprocessor through a first rheostat;
      and the booster comprising
         an electronic switch connected to the battery and having an open and closed duty cycle;
         a PWM generator and current compensation IC controlling the duty cycle of the electronic switch and having
            a power input connected to the battery through the power supply switch;
            a PWM output connected to the electronic switch;
            a current feedback input connected to the PWM output; and
            a clock signal input;
         a booster inductance connected to the electronic switch, the battery and the power output terminal;
         a resistor connected to the current feedback input of the PWM generator and current compensation IC, the electronic switch and ground;
         an RC oscillator connected to the clock signal input of the PWM generator and current compensation IC and having a capacitor connected to the microprocessor; and
         a fuse connected between the battery and the booster inductance;
      a power supply controller connected to the power output terminal of the booster and having
         a controlling terminal connected to the microprocessor;
         a power input connected to the power output terminal of the booster; and
         a power output connected to the power output socket and the microprocessor;
      and the power supply controller comprising
         a transistor having a base terminal connected to the microprocessor, a collector terminal and an emitter terminal connected to ground; and
         a relay having a coil connected to the collection terminal of the transistor and a switch connected between the power output terminal and the power output socket;
   a battery indicator connected to the circuit board and consisting of multiple different colored LEDs connected to the microprocessor; and
   an alarm unit connected to the microprocessor and comprising
      a transistor having a base terminal connected to the microprocessor, a collector terminal and an emitter terminal connected to ground; and
      a buzzer connected to the collector terminal.

2. The charger as claimed in claim 1, further comprising:
   an illumination switch mounted on the case; and
   an illumination device connected to the case and further connected to the battery through the illumination switch.

3. The charger as claimed in claim 2, further comprising a fuse socket mounted on the portable case, wherein the fuse is mounted in the fuse socket.

* * * * *